(12) United States Patent
Aust et al.

(10) Patent No.: US 8,427,577 B2
(45) Date of Patent: Apr. 23, 2013

(54) METHOD FOR CONVERTING BETWEEN INTERLACED VIDEO AND PROGRESSIVE VIDEO DURING TRANSMISSION VIA A NETWORK

(75) Inventors: Andreas Aust, Hannover (DE); Stelian F Persa, Breda (NL)

(73) Assignee: TIXEL GmbH, Hannover (DE)

(*) Notice: Subject to any disclaimer, the term of this patent is extended or adjusted under 35 U.S.C. 154(b) by 31 days.

(21) Appl. No.: 13/128,422

(22) PCT Filed: Nov. 6, 2009

(86) PCT No.: PCT/EP2009/064747
§ 371 (c)(1),
(2), (4) Date: Aug. 26, 2011

(87) PCT Pub. No.: WO2010/052302
PCT Pub. Date: May 14, 2010

(65) Prior Publication Data
US 2011/0298976 A1 Dec. 8, 2011

(30) Foreign Application Priority Data
Nov. 10, 2008 (EP) .................................... 08305793

(51) Int. Cl.
*H04N 7/01* (2006.01)
(52) U.S. Cl.
USPC ........................................................ 348/448
(58) Field of Classification Search .......... 348/441–448, 348/458, 459
See application file for complete search history.

(56) References Cited

U.S. PATENT DOCUMENTS

| 5,170,251 A | 12/1992 | Levy |
| 6,333,938 B1 | 12/2001 | Baker |
| 2005/0002402 A1* | 1/2005 | Fairman ...................... 370/395.5 |
| 2005/0008240 A1* | 1/2005 | Banerji et al. ................ 382/238 |
| 2008/0095155 A1* | 4/2008 | Danzig .......................... 370/389 |
| 2011/0010607 A1* | 1/2011 | Raveendran .................. 714/776 |
| 2011/0271007 A1* | 11/2011 | Wang et al. ................... 709/238 |

FOREIGN PATENT DOCUMENTS

| EP | 1017235 A2 | 7/2000 |
| WO | 9952290 | 10/1999 |

OTHER PUBLICATIONS

International Search Report dated Dec. 8, 2009 for related International application No. PCT/EP2009/064747.
Chang, K.W. et al., "A network interface for real-time video services on a high-speed multimedia LAN", IEEE Xplore, Singapore ICCS/ISITA '92, Communications on the Move, pp. 16-19, vol. 1, Nov. 16-20, 1992.
Hoffman, H., "Studio-Interfaces fur die paketierte Ubertragung von bitratenreduzierten Videosignalen", Fernseh Und Kinotechnik, 50, pp. 300-308, Jahrgang, Nr. Jun. 1996.

* cited by examiner

*Primary Examiner* — Paulos M Natnael
(74) *Attorney, Agent, or Firm* — Howard IP Law Group, PC

(57) ABSTRACT

A method for converting video data comprises providing video data in a first format, selecting consecutive pixel data corresponding to a line or fraction of a line of an image, and adapting a maximum length of a data packet to accommodate the selected pixel data. The payload section of a data packet exclusively carries pixel data originating from one single line of the source image. The method further comprises calculating a start address for a memory in a receiver beginning at which address the pixel data is to be written. The start address is added to a header section of the data packet in the transmitter. The data packet is transmitted via a network. In the receiver the pixel data is written to the memory beginning at the start address indicated in the header section. Video data is read from the target memory in accordance with a second format.

16 Claims, 2 Drawing Sheets

Figure 1:
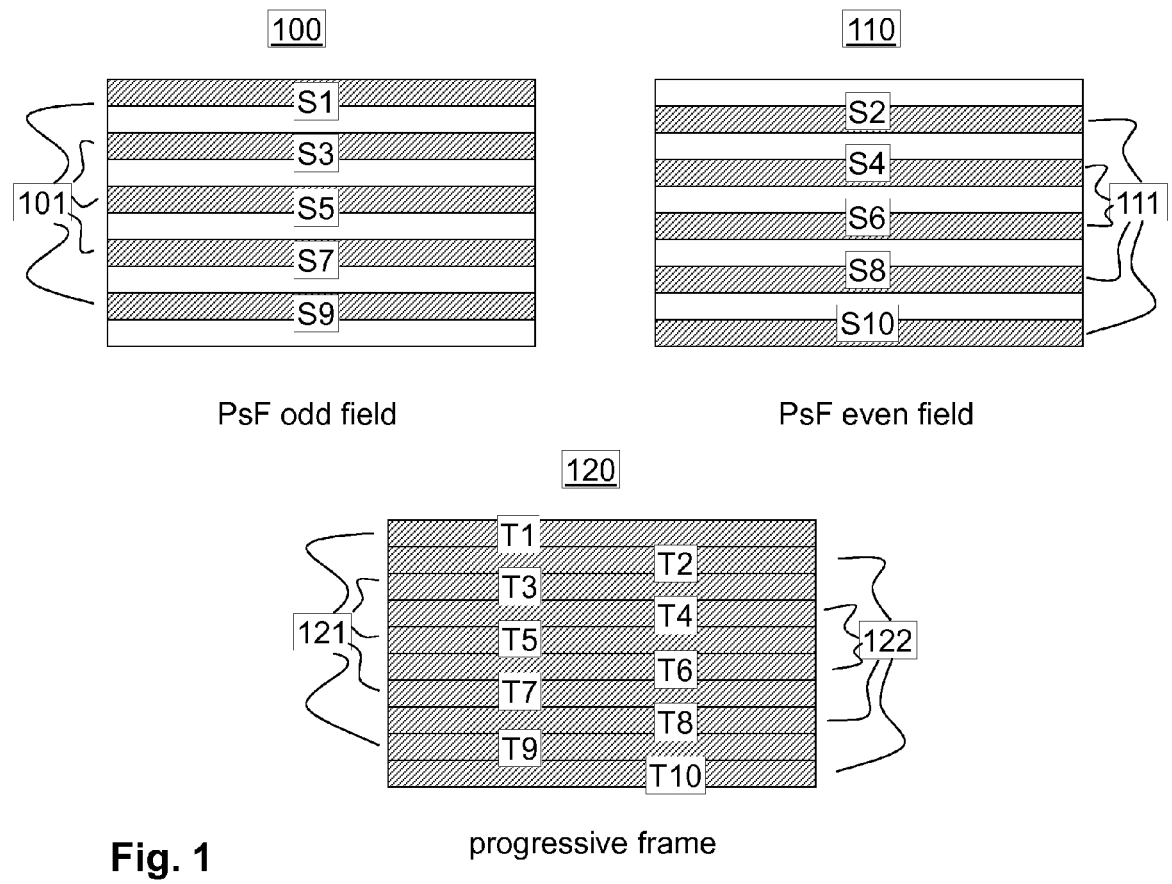

METHOD FOR CONVERTING BETWEEN INTERLACED VIDEO AND PROGRESSIVE VIDEO DURING TRANSMISSION VIA A NETWORK

This application is the national stage application under 35 U.S.C. §371 of International Application No. PCT/EP2009/064747 and claims the benefit of International Application No. PCT/EP2009/06747, filed Nov. 6, 2009, and European Application No. 08305793.5, filed Nov. 10, 2008, the entire disclosures of which are incorporated herein by reference in their entireties.

FIELD OF THE INVENTION

This application relates to transmission of video data across a network.

In video and film production environments high resolution video material needs to be transferred over high speed networks. In some cases, the video is streamed from a storage device to a display device via a network supporting RTP (Real-time Transport Protocol) at a high data rate. For example, streaming 4 k video material in real-time can result in data rates around 10 Gbps depending on frame rate, color depth, etc.

Considering HD (High definition) or so-called 2 k video material having as many as 1920 or 2048 pixels per line of video the data rate can still be around 1.6 Gbps.

In some cases it might be necessary to convert the video data to a different format in order to be able to process or display the data. A common scenario is that the video is available in PsF (Progressive with Segmented Frames) format at the source e.g. a Camera and needs to be transmitted and displayed in progressive format.

Progressive format relates to capturing and reproduction of all pixels of a video image at one time. Progressive video consequently consists of a sequence of full images that are taken consecutively.

Interlaced video, however, relates to capturing and reproduction of a first set of lines of video that are evenly spaced from each other at a first time, and capturing and reproduction of a second set of lines of video that includes only those lines which were not captured and reproduced at the first time at a second time. The full set of lines of a video image is captured and reproduced in two times. Of course other combinations of sets of lines are conceivable, in which three or more sets add up to a full set of lines.

PsF format relates to a video format in which a full image is captured at one time, but the image is split into an interlaced format for transmission, in which all even numbered lines of the video image are transmitted in a first field, and all odd numbered lines of the video image are transmitted in a second field. When the fields are combined in a receiver the resulting image corresponds to the original full image. Unlike in true interlaced format the fields of one full image or frame carry image information from one instant in time only.

Usually that transformation between PsF format and progressive format is done by copying each video line from the first and second field into a part of a memory which holds the completed frame and reassigning the position of the respective lines of video in the resulting video frame. The process of copying may be done either at the sending side or at the receiving side. As mentioned above copying data at high data rates consumes a lot of CPU power that could be used for other processing steps, or might not be possible in real time at all.

The display device, e.g., a PC with multiple graphic adapters connected to a video display device such as a video projector, needs to handle the high data rate associated with high definition progressive video. In order to alleviate this task the additional processing associated with copying data needs to be kept at a minimum.

It is an object of the invention to provide an improved method for converting between interlaced video and progressive video while transmitting the video data over a network.

According to the inventive method video data is converted during a transmission via a network. Video data is provided in a first format to a first memory at a transmitting end of a network. From the video data in the first memory consecutive pixel data corresponding to a line or a fraction of a line of a source image is selected for transmission. The maximum length of the data packets to be transmitted is adapted to accommodate the selected consecutive pixel data. The maximum length of a data packet, or packet size, may be referred to as maximum transmission unit size, or MTU size. The term MTU size is well known in IP based networks. In the case a line of video must be transmitted in fractions due to the maximum length of a data packet being smaller than the total amount of data in the line of video, the data to be transmitted in one packet is selected so as to fit within one MTU size. The total data of one line of video is then transmitted by a sequence of data packets. In any case each data packet exclusively carries pixel data originating from one single line of video. The data packet includes a header and a payload section. A start address for a second memory at a receiving end of the network is calculated, beginning at which start address the selected consecutive pixel data is to be written into the second memory upon receiving. The calculated start address is added to information in the header section of the data packet. The selected pixel data from the first memory at the transmitting end of the network is added to the payload section of the data packet, and the data packet is transmitted via the network. The data packet is received at the receiving end of the network. The payload of the received data packet is written to the second memory beginning at the start address indicated in the header section of the received data packet. Finally, the video data is read from the second memory in accordance with a second format.

Adapting the maximum size of the data packet, notably adapting the maximum size of the payload of the data packet, to match the amount of data corresponding to one complete line of video or to the amount of data corresponding to a fraction of a line of video dispenses with the need for intermediate buffering of the received data packet in order to be able to assign the transmitted pixel information to the correct line of video at the receiver side. This allows for simply writing the received data to the memory location indicated by the information carried in the header of the data packet, while knowing that all data from a specific data packet that is written beginning at the specified memory location belongs to the same line of video.

In the prior art, if a received data packet carries pixel data corresponding to two different lines of video the receiver needs to assign the pixel data to the respective target video lines in the memory of the receiver. This can only be done by intermediate buffering of the received data packet and subsequent analysis for determining which pixel belongs to which line of video.

In a preferred embodiment of the invention the network is an IP based network, notably using an RTP/UDP protocol.

In another embodiment of the invention the network is a system for direct memory access (DMA).

In accordance with the invention the first video format may correspond to progressive segmented frame (PsF) video format, and the second video format may correspond to progressive video format.

In yet another embodiment of the invention the fractions of a line of the source image selected for transmission are selected to have substantially equal length. This avoids having to send data packets of variable length in order to transmit the data of one line of video, in particular having to send a very small amount of data in the last data packet of a sequence of data packets required for transmitting one full line of video.

As mentioned above, the present invention advantageously avoids time consuming data copying steps during the transmission of video data, for example an RTP based transmission of video data from DPX files, where the source video format is PsF and the required destination video format is progressive. RTP is a real-time transport protocol defining a standardised packet format for delivering audio and video over IP networks. DPX, or digital picture exchange, is a common file format for digital intermediate and visual effects work. It is defined in ANSI/SMPTE standard 268M-2003. The time consuming process of copying each video line at the sender side in order to reconstruct one full frame from the corresponding two half frames, or fields, is avoided. As a consequence, the processing power and the memory that has to be integrated at the source of the video signal, for example a camera, or the target of the video signal, for example a mobile high resolution display unit, can be reduced, while still being capable of handling the format conversion in real-time.

The invention advantageously allows for using conventional streaming techniques based on well known protocols like RTP to support high resolution real-time video streaming while converting from a first format into a second format. Notably, less powerful embedded components that are part of cameras or display units are now capable of performing frequently used format conversions in a very efficient way. However, the method according to the invention may as well be implemented in other transmission protocols that use data packets having a header section and a payload section.

Selecting the pixel data to be sent at the transmitter side and attaching a target memory address for writing the received data at the receiver side allows for using the method irrespective of the kind of channel coding that is applied for the actual transmission. That is, once the data to be put into one data packet has been selected and the target memory and address has been added it is not important whether the transmission it uses interleaving, parity bits or any other coding for the actual transmission over the channel. It is even possible to use encryption schemes and other reversible processing applied to the data during transmission without affecting proper execution of the method.

Once a full video image is received at the receiver side it can be accessed as a single file or as a single block from the receiver's memory.

In the exemplary embodiment using the RTP/UDP protocol for transmission the maximum size of the data packets that can be sent is limited. However, the absolute maximum size for this particular protocol is larger than the pixel data of one line of video from a 2 k or even full HD video, if so-called Jumbo frames are used. It is recalled at that one line of 2 k video has 2048 pixels, and one line of full HD video has 1920 pixels. The actual amount of data depends on the number of bits that are used for coding the colour information, typically 8 bits or 10 bits per colour. An exemplary line of 2 k video consists of 2048*4 bytes=8192 bytes, and exemplary line of full HD video consists of 1920*4 bytes=7680 bytes of data.

Standard Ethernet networks have a maximum transmission unit size (MTU size) of 1500 bytes. However, more recent network protocol adaptations allow for so-called Jumbo frames, in which the maximum transmission unit size is larger than 1500 bytes. Using Jumbo frames reduces the overhead of the network transmission and is often employed when large amounts of data need to be transferred via a network. Depending on the hardware used the maximum transmission unit size lies in a range from 9000 to 16.000 bytes. Gigabit Ethernet, for example, allows for Jumbo frames having an MTU size of 9000.

In the foregoing example 1 full line of full HD video or 2 k video can be transmitted within one Jumbo frame, not even reaching the maximum payload limit of that Jumbo frame. Usually the remaining payload of a frame is used for transmitting data of the next line of video that is to be transmitted. In doing so the payload of one frame may contain information of two different lines of video.

By reducing the maximum size of a data packet to accommodate as many bytes as are required for transmitting one line of video from a 2 k video or from a full HD video, and by adding to the header of the data packet a target address into which the payload is to be written in a memory at the receiver side it is possible to avoid the situation that the payload of one data packet also includes pixel data of another line of video, which would have to be separated and written to the respective correct memory location.

One line of 4 k video consists of 4096 pixels. If, for example, each pixel is determined by 4 bytes one line of 4 k video consists of 16384 bytes. This amount of data exceeds even the largest payload of the Jumbo frames in Gigabit Ethernet. In this case the pixel data of one line of video may be transmitted in two subsequent Jumbo frame data packets of 8192 bytes. Adapting the size of the maximum transmission unit to accommodate one half of the pixel data of one line provides the same advantage as in the foregoing example, i.e. a data packet always only contains data originating from one single line of video. It is, of course, possible to use other numbers of data packets to send the data of one full line of video, depending on the individual needs of an apparatus or a transmission protocol.

However, even if the maximum transmission unit size of the transmission channel that is used is 1500, as often found in conventional Ethernet networks, the inventive method may be advantageously applied. In this case one line of video is split into segments, preferably of substantially equal length, each of the segments corresponding to a number of data bytes that is smaller than 1500. In the foregoing example a line of full HD video consisting of a total of 7680 bytes would fit into 5 frames having the maximum length of 1500 bytes and one frame having a length of 180 bytes. In this case it would be possible to reduce the MTU size for the last frame only.

In order to avoid having to repeatedly adjust the MTU size for individual frames it would be useful to set the MTU size to 1280 four full HD video. In the first example above the total number of 7680 bytes could be transmitted using 6 frames of equal length. For 2 k video the MTU size would be set to 1366, and 6 frames of equal length would accommodate the 8192 bytes of data forming one full line of 2 k video.

As a side effect of using the inventive method the number and/or the size of buffers necessary at the receiver side is reduced, since the payload of any data packet can be written into the main memory of the receiver right away.

Figure 2:
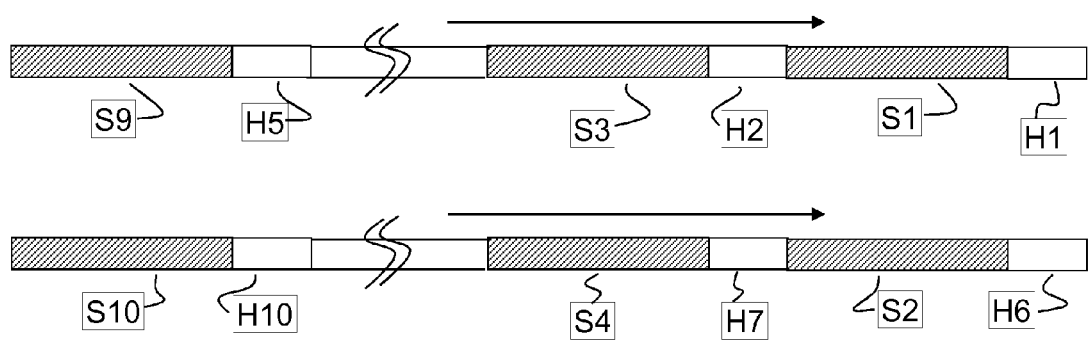
Figure 3:
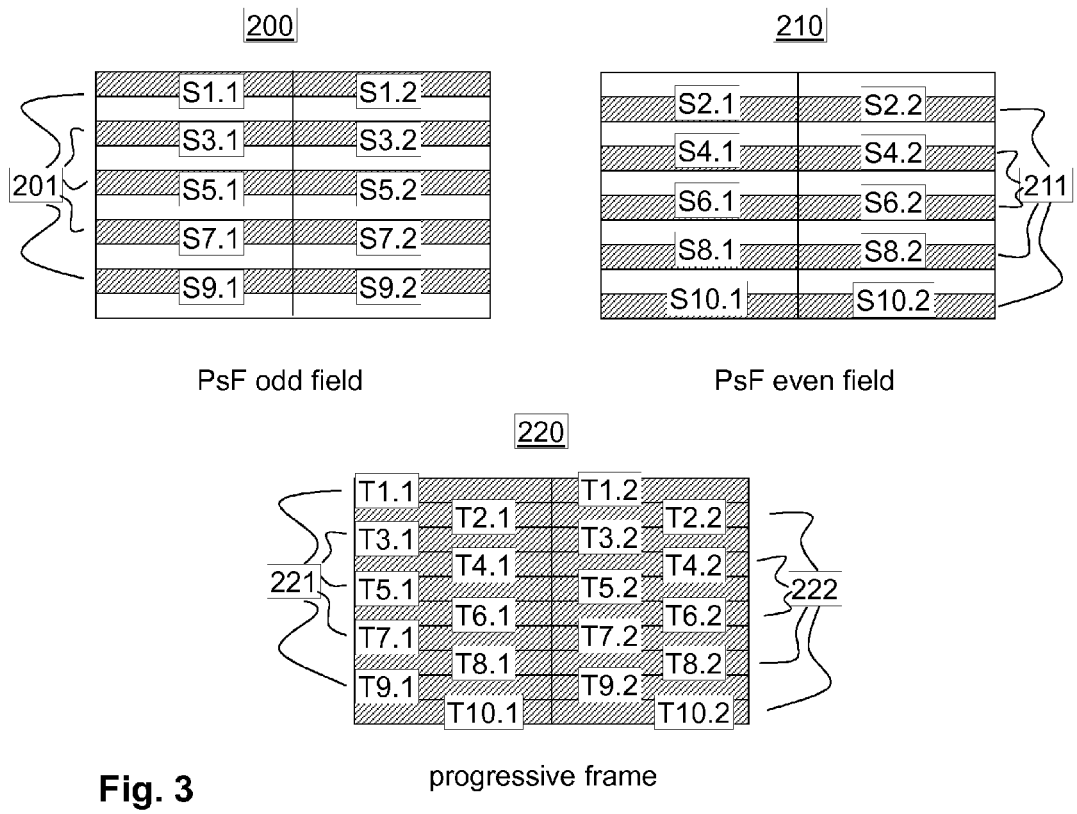
Figure 4:
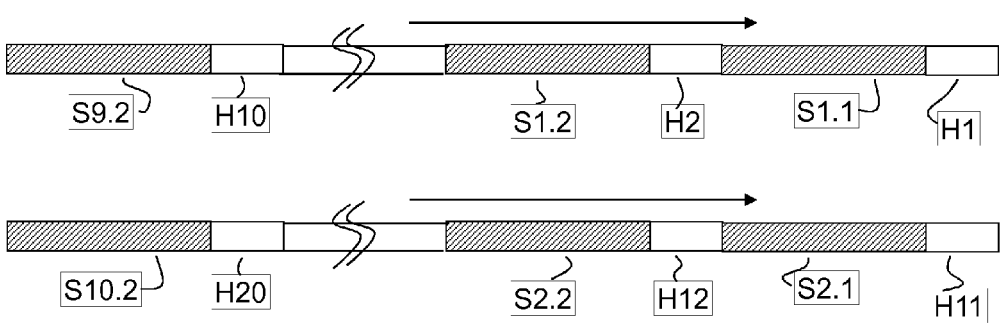

In the following section the invention will be described with reference to the attached drawing. In the drawing FIG. 1 diagrammatically shows a first example for the combination of two PsF fields into one progressive frame;

FIG. 2 diagrammatically shows a sequence of data packets in accordance with the first example;

FIG. 3 diagrammatically shows a second example for the combination of two PsF fields into one progressive frame; and FIG. 4 diagrammatically shows a sequence of data packets in accordance with the second example.

In the figures, identical or like elements are identified by the same reference numerals.

FIG. 1 diagrammatically shows the combination of two PsF video fields into one progressive video frame. In this example, the pixel data of one line of video fits within the payload section of one data packet. The odd field 100 of the PsF video signal contains the odd lines 101. The odd lines 101 are denominated S1, S3, S5, S7, and S9. The even field 110 of the PsF video signal contains the even lines 111. The even lines 111 are denominated S2, S4, S6, S8, and S10. For simplicity reasons each of the fields consists of only five lines of video. It goes without saying that the number of lines per field or frame will be significantly larger in real applications. It is further to be noted that the lines in between the odd and even lines, respectively, are not actually present in the memory when the even or odd field, respectively, are retrieved or generated for transmission. This allows for keeping the memory small at the sender's side, because only one field must be buffered instead of a full frame. It is even possible to make the send buffer memory as small as one line of video plus the header, if the lines of video are retrieved from the storage or are created in a line-by-line fashion.

In a first example for format conversion during transmission the odd field 100 and the even field 110 are retrieved or generated at a source in a sequential manner, i.e. first the odd field is generated or retrieved from a storage, and only after the complete odd field has been transmitted the even field is generated or retrieved from a storage, and transmitted subsequently. In this example the receiving apparatus must provide a storage that is large enough for holding one complete frame 120 of progressive video, while the memory in the sending apparatus only needs to hold the pixel data of one field. The odd lines 121 of the progressive video frame 120 in the storage of the receiver are denominated T1, T3, T5, T7, and T9. The even lines 122 of the progressive video frame 120 in the storage of the receiver are denominated T2, T4, T6, T8, and T10.

FIG. 2 diagrammatically shows a sequence of data packets in accordance with the first example. According to the example at first all video lines of the odd field are transmitted from a source to the receiver. Consequently, the first data packet carries, in its payload section, the pixel data corresponding to the first odd line S1. The according header H1 precedes the payload section. In the figure, the payload section is identified by the same background pattern that is applied to identify the respective lines of video in FIG. 1. The header has a white background. The next data packet preceded by header H2 carries the pixel data of the next odd line S3. Transmission of the odd field is terminated by sending the last line of video, which is line S9. Line S9 is sent in the data packet preceded by header H5. Once the odd field has been completely transmitted the even field will be transmitted. Transmission of the even field begins with transmission of the first even line S2 in the data packet preceded by header H6. The next data packet preceded by header H7 carries, in its payload section, the pixel data of even line S4. Transmission of the even field 110 is terminated when even line S10 is transmitted in the data packet preceded by header H10.

The header preceding each data packet carries information about the address beginning at which the payload is written to a memory in the receiver. For example, the first odd line S1 from the odd field 100 is to be written into the memory of the receiver in such a way that it occupies the memory space assigned to target line T1. The header H1 of the first data packet carries according information about the start address of the assigned memory space. Further, the maximum length of the data packets has been set such that only pixel information from the first odd line S1 is present in the payload section of the first data packet. Consequently, when the last data item received is written into the memory at the receiver the complete memory space assigned to target line T1 is filled up and one complete line has been received.

The second data packet carries pixel information of the second odd line, which is the third line of the progressive frame. The header H2 of the second data packet accordingly carries information about the start address of the assigned memory space for target line T3. Once the last data item is received and written into the memory the complete memory space assigned to the third target line T3 is filled up and one complete line has been received.

FIG. 3 diagrammatically shows the combination of two PsF video fields into one progressive video frame. In this example, the pixel data of one line of video does not fit within the payload section of one data packet. Rather, the pixel data of one line of video must be transferred in two data packets, and the video lines must be split into sections accordingly. The odd field 200 of the PsF video signal contains the odd lines 201. The sections of the odd lines 201 are denominated S1.1, S1.2, S3.1, S3.2, S5.1, S5.2, S7.1, S7.2, S9.1 and S9.2. The index 0.1 or 0.2 indicates whether the corresponding pixel data is transmitted in the first or the second data packet for the respective line of video. The even field 210 of the PsF video signal contains the even lines 211. The sections of the even lines 211 are denominated S2, S4, S6, S8, and S10 with respective indices 0.1 or 0.2, just like the odd field. Again, for simplicity reasons each of the fields consists of only five lines of video.

The combined progressive frame 220 shows how the received lines of the odd and even field are arranged.

FIG. 4 diagrammatically shows the data packets that are sent for combining the odd field 200 and the even field 210 into progressive frame 220 of FIG. 3. The first data packet preceded by the first header H1 carries the data of the first section S1.1 of the first line of video. The next data packet preceded by the second header H2 carries the data of the second section S1.2 of the first line of video. Each of the first and second data packets exclusively carries pixel data originating from a single line of video. Transmission of the odd fields 200 is terminated when the 10th data packet preceded by header H10 has been sent, which carries the second section S9.2 of the last odd line of odd field 200. The first data packet of the even field that is transmitted after the odd field has been transmitted, preceded by header H11, consequently carries the first section S2.1 of the first even line of video. The second section S2.2 of the first even line of video of the even field is transmitted right away in the data packet preceded by header H12. Transmission of the even field is terminated when the 20th data packets, preceded by header H20 and carrying the second section S10.2 of the last even line, has been sent. Each of the headers includes information allowing for identifying the address in the memory of the receiver into which the video data is to be written. In this way it is ensured that the video data of the second section of a line of video is written immediately subsequent to the video data of the first section of the line of video.

The address beginning at which the data is to be written in the receiver's memory may be provided as an absolute address, or as an offset with reference to a previously transmitted data packet. It is calculated at the sender's side.

While in this specification the conversion from progressive segmented frame format into progressive format has been shown the method according to the invention can as well be used for a conversion in the opposite direction.

The invention claimed is:

1. Method of converting video data during a transmission via a network, comprising:
   providing video data in a first format at a transmitting end of a network;
   selecting, for transmission, consecutive pixel data corresponding to a line or a fraction of a line of a source image from the video data;
   adapting a maximum length of a data packet defined as a maximum transmission unit size (MTU size) to be transmitted to accommodate the selected consecutive pixel data, wherein the data packet includes a header and a payload section, and wherein a data packet exclusively carries pixel data originating from one single line of video;
   calculating a start address for a target memory at a receiving end of the network beginning at which start address the selected consecutive pixel data is to be written into the target memory upon receiving, and adding the start address to information in the header section of the data packet;
   adding the selected pixel data to the payload section of the data packet, and transmitting the data packet via the network;
   receiving the data packet at the receiving end of the network;
   writing the payload of the data packet to the target memory beginning at the start address indicated in the header section of the data packet; and
   reading the video data from the target memory in accordance with a second format.

2. The method of claim 1, wherein the fractions of a line of a source image selected for transmission are selected to have substantially equal length.

3. The method of claim 1, wherein the video data of the first video format is provided to a first memory at the transmitting end of the network.

4. The method of claim 1, wherein the selected pixel data is added to the payload section of the data packet to be sent from the first memory at the transmitting end of the network.

5. The method of claim 1, wherein the network is an Internet Protocol (IP)-based network, using a Real-Time Transport Protocol/User Datagram Protocol (RTP/UDP protocol).

6. The method of claim 1, wherein the network is a system for direct memory access (DMA).

7. The method of claim 1, wherein the first video data format is progressive segmented frame video format, and the second video format is progressive video format.

8. The method of claim 1, wherein the first video data format is progressive format and the second video format is progressive segmented frame video format.

9. The method of claim 2, wherein the network is an Internet Protocol (IP)-based network, using a Real-Time Transport Protocol/User Datagram Protocol (RTP/UDP protocol).

10. The method of claim 2, wherein the network is a system for direct memory access (DMA).

11. The method of claim 2, wherein the first video data format is progressive segmented frame video format, and the second video format is progressive video format.

12. The method of claim 2, wherein the first video data format is progressive format and the second video format is progressive segmented frame video format.

13. The method of claim 3, wherein the network is an Internet Protocol (IP)-based network, notably using a Real-Time Transport Protocol/User Datagram Protocol (RTP/UDP protocol)+.

14. The method of claim 3, wherein the network is a system for direct memory access (DMA).

15. The method of claim 3, wherein the first video data format is progressive segmented frame video format, and the second video format is progressive video format.

16. The method of claim 3, wherein the first video data format is progressive format and the second video format is progressive segmented frame video format.

* * * * *